US012766537B1

(12) United States Patent
Arminak

(10) Patent No.: US 12,766,537 B1
(45) Date of Patent: Oct. 20, 2026

(54) ALL PLASTIC FOOD PUMP

(71) Applicant: APG Packaging, Azusa, CA (US)

(72) Inventor: Armin Arminak, Azusa, CA (US)

(73) Assignee: APG PACKAGING, Azusa, CA (US)

( * ) Notice: Subject to any disclaimer, the term of this patent is extended or adjusted under 35 U.S.C. 154(b) by 0 days.

(21) Appl. No.: 19/414,140

(22) Filed: Dec. 9, 2025

Related U.S. Application Data

(60) Provisional application No. 63/790,522, filed on Apr. 17, 2025.

(51) Int. Cl.
*B05B 11/10* (2023.01)

(52) U.S. Cl.
CPC ...... *B05B 11/1067* (2023.01); *B05B 11/1016* (2023.01)

(58) Field of Classification Search
CPC ............. B05B 11/1023; B05B 11/1008; B05B 11/1059; B05B 11/1087; B05B 11/1077; B05B 11/111067; B05B 11/1016
See application file for complete search history.

(56) References Cited

U.S. PATENT DOCUMENTS 4,144,983 A * 3/1979 Pauls ................ B29C 49/04112 215/44
5,360,127 A * 11/1994 Barriac ............... B05B 11/0008 215/276
5,924,603 A * 7/1999 Santagiuliana ..... B05B 11/1023 222/336
6,095,358 A * 8/2000 Marino .............. B65D 41/0471 215/305
6,695,176 B1 * 2/2004 Nazari .................. B05B 11/106 222/321.9
10,335,816 B1 * 7/2019 Arminak ............. B05B 11/1023
11,267,009 B1 * 3/2022 Cassoni .............. B05B 11/1011
11,389,814 B1 7/2022 Arminak
11,471,905 B1 10/2022 Arminak
11,772,114 B2 * 10/2023 Zhu ..................... B05B 11/1043 222/320
D1,009,628 S 1/2024 Arminak
11,969,743 B2 4/2024 Fischer
2004/0149777 A1 * 8/2004 Santagiuliana ..... B05B 11/1023 222/190
2005/0072807 A1 * 4/2005 Hsiao .................... G01F 11/028 222/251
2007/0138208 A1 6/2007 Scholz et al.
2015/0272398 A1 * 10/2015 Arminak ............. B05B 11/1087 222/190

(Continued)

FOREIGN PATENT DOCUMENTS

| | | |
|---|---|---|
| JP | 2024000452 | 6/2022 |
| WO | WO 2020/144369 | 7/2020 |
| WO | WO 2022/233077 | 11/2022 |

*Primary Examiner* — Vishal Pancholi
(74) *Attorney, Agent, or Firm* — Cislo & Thomas LLP

(57) ABSTRACT

A hand operated food pump fabricated entirely from plastic components including the pump return spring, is provided. The pump is suitable for dispensing pumpable food products such as ketchup, mustard, mayonnaise and the like. The pump uses an arrangement of three internal valves, i.e. upper and lower valves and a nozzle or outlet valve, to dispense such pumpable food products. Being made of all plastic components, used pumps do not require disassembly to be recycled.

22 Claims, 12 Drawing Sheets

(56) References Cited

U.S. PATENT DOCUMENTS

| | | | | |
|---|---|---|---|---|
| 2016/0249774 | A1 * | 9/2016 | Ophardt | B05B 11/1014<br>222/135 |
| 2019/0344297 | A1 * | 11/2019 | Barenhoff | B05B 11/1023 |
| 2022/0314251 | A1 * | 10/2022 | Arminak | B05B 11/0008 |
| 2023/0092170 | A1 | 3/2023 | Arminak | |
| 2024/0025603 | A1 | 1/2024 | Paget et al. | |

* cited by examiner

ALL PLASTIC FOOD PUMP

CROSS-REFERENCE TO RELATED APPLICATION

This patent application claims priority to U.S. Application No. 63/790,522, filed Apr. 17, 2025, and is incorporated in its entirety herewith by this reference.

BACKGROUND OF THE INVENTION

Field of the Invention

This invention relates to dispensing pumps for dispensing fluids and, in particular, to a hand operated, food dispensing pump made from all plastic components.

Background Art

Hand operated, food dispensing pumps are well known in the fast food industry for dispensing fluid food products such ketchup, mustard, mayonnaise and like products. The majority of hand operated, food dispensing pumps presently available are made from plastic but include at least a metal compression spring to return the pump actuator to its starting position after being depressed. Typically, hand operated, food dispensing pumps are installed on containers of pumpable food products. For sanitation reasons, the pumps and are disposed of along with the container when the contents of the container are depleted. The pumps are not typically intended to be reused. Although pumps using metal return springs operate effectively, and are of relatively low cost to make, they have certain drawbacks. In particular, the steel compression springs typically used in such pumps may cause rust contamination of the product to be dispensed. Also, the vents of prior art hand operated pumps are typically located on or about the pump closure, a location frequently splashed with water, and thereby may lead to water contamination of the pumpable food product to be dispensed. In addition, due to their containing metal components, prior art hand operated, food pumps are difficult to recycle.

Plastic parts are recycled by grinding or shredding the parts. The shredded material may then be reused, typically by melting the material and mixing it with new plastic. To be suitable for grinding or shredding, used plastic must be free of any metal parts. A hand operated, food pump using a metal return spring, or any metal components, must be disassembled to remove the metal components prior to recycling the plastic materials which compose the bulk of the pump. The need to disassemble a used hand pump to remove the metal components prior to recycling increases costs and has the effect of decreasing the desirability of used hand operated, pumps as a source of recycled plastic. Thus, there is a need in the art for a hand operated, food pump made from all plastic components. Such pumps would require no disassembly prior to being ground or shredded for use as recycled plastic. There is further a need for a hand operated, food pump, with vents located in an area, well protected from water intrusion.

SUMMARY OF THE INVENTION

The present invention meets a long-felt need in the art by providing a new hand operated, food pump design that is fabricated entirely from plastic materials. The hand operated, food pump of the present invention eliminates potential contamination of the product to be dispensed due to rusting of the steel compression springs typically found in prior art hand pumps and, being made of all plastic components, is easy to recycle. The hand operated, food pump of the present invention also incorporates a vent configuration locating the pump vents in an upper portion of the pump housing which is enclosed by the pump's closure. This new design offers a substantial increase in the degree of water resistance in comparison to prior art hand, operated pump designs.

The major components of the hand operated, food pump of the present invention comprise a pump housing having a hollow, cylindrical interior or bore, a closure attachable to an upper end of the pump housing, a stem having a hollow, cylindrical internal passage or bore and configured with an integral piston at its lower end, an actuator attachable to the stem, the actuator having a nozzle and, a dip tube for insertion into a container filled with a liquid or pumpable food product.

The hand operated, food pump of the present invention also features a diaphragm style, lower valve located at an inlet of the pump housing and a ball style, upper valve or primary upper valve located at an outlet of the stem. The hand operated, food pump also features a nozzle valve or secondary upper valve, which is a one-way check valve located at an outlet of the nozzle. In the exemplary embodiment, the secondary upper valve is a duckbill style valve.

The hand operated, food pump of the present invention operates as follows:

(1) On the first down stroke, air pressure caused by the piston moving downwardly in the bore of the housing causes the lower valve to close and simultaneously causes the upper valves to open. With the lower valve closed and the upper valves open, air in the housing is forced through the bore of the stem and is exhausted through the nozzle, as the actuator is depressed. (2) On the first up stroke, suction caused by the piston moving upwardly in the bore of the housing causes the lower valve to open and the upper valves to close. With the lower valve open and the upper valves closed, pumpable food product is drawn from the food container through the dip tube and into the bore of the housing. (3) On the second down stroke, as the piston moves downwardly positive pressure again causes the lower valve to close and the upper valves to open. With the lower valve closed and the upper valves open, pumpable food product forced into the bore of the stem and is expelled out the nozzle, during the piston's downwards movement. (4) On the second up stroke, suction caused by the piston moving upwardly in the bore of the housing again causes the lower valve to open and the upper valves to close. With the lower valve open and the upper valves closed, pumpable food product is again drawn from the food container through the dip tube and into the bore of the housing.

The functions of steps (3) and (4) repeat each time the actuator is subsequently depressed. During all operations, the plastic spring of the pump, which is in the form of a dome, acts as a compression spring and provides the force necessary to drive the piston upwardly on the upstroke.

To provide for smooth operation of the hand pump, venting of the housing above the level of the piston is desirable. In the hand operated, food pump of the present invention, vents are located at an upper end of the housing such that they are above the highest level of the piston throughout its stroke. The vents are essentially enclosed within the closure when it is attached to a container, preventing contamination of the pump by water or cleaning fluids.

The above and other advantages of the hand operated, food pump of the present invention will be described in more detail below.

DETAILED DESCRIPTION OF THE PREFERRED EMBODIMENTS

The present invention will now be described more fully hereinafter with reference to the accompanying drawings, in which preferred embodiments of the invention are shown. The invention however, may be embodied in many different forms and should not be construed as being limited to the embodiments set forth herein. Rather these embodiments are provided so that this disclosure will be thorough and complete, and will fully convey the scope of the invention to those skilled in the art. Like numbers refer to like elements throughout.

DESCRIPTION OF THE COMPONENT PARTS

Figure 1:
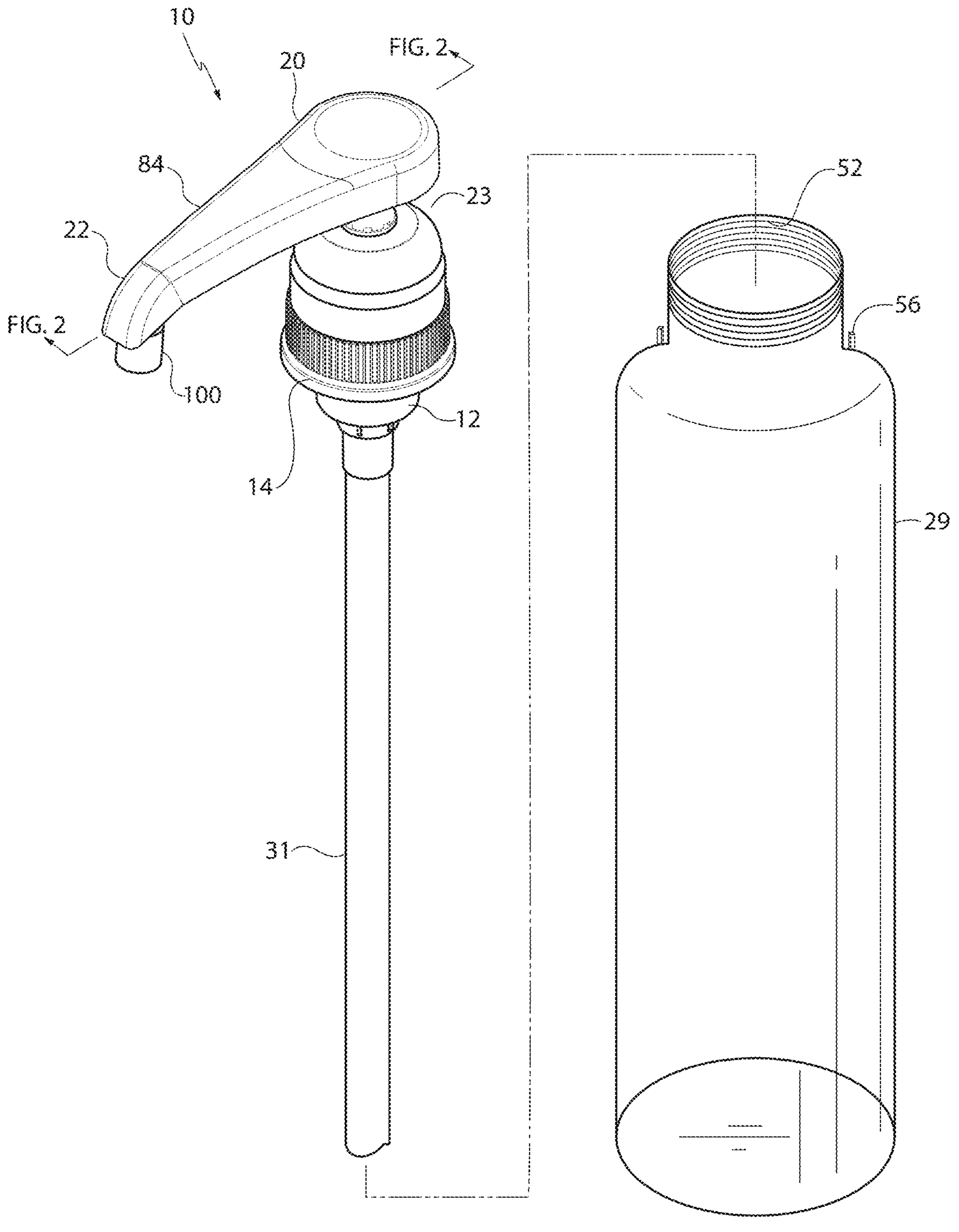
FIG. 1 is a perspective view of a hand operated, food pump in accordance with the present invention.
Figure 2:
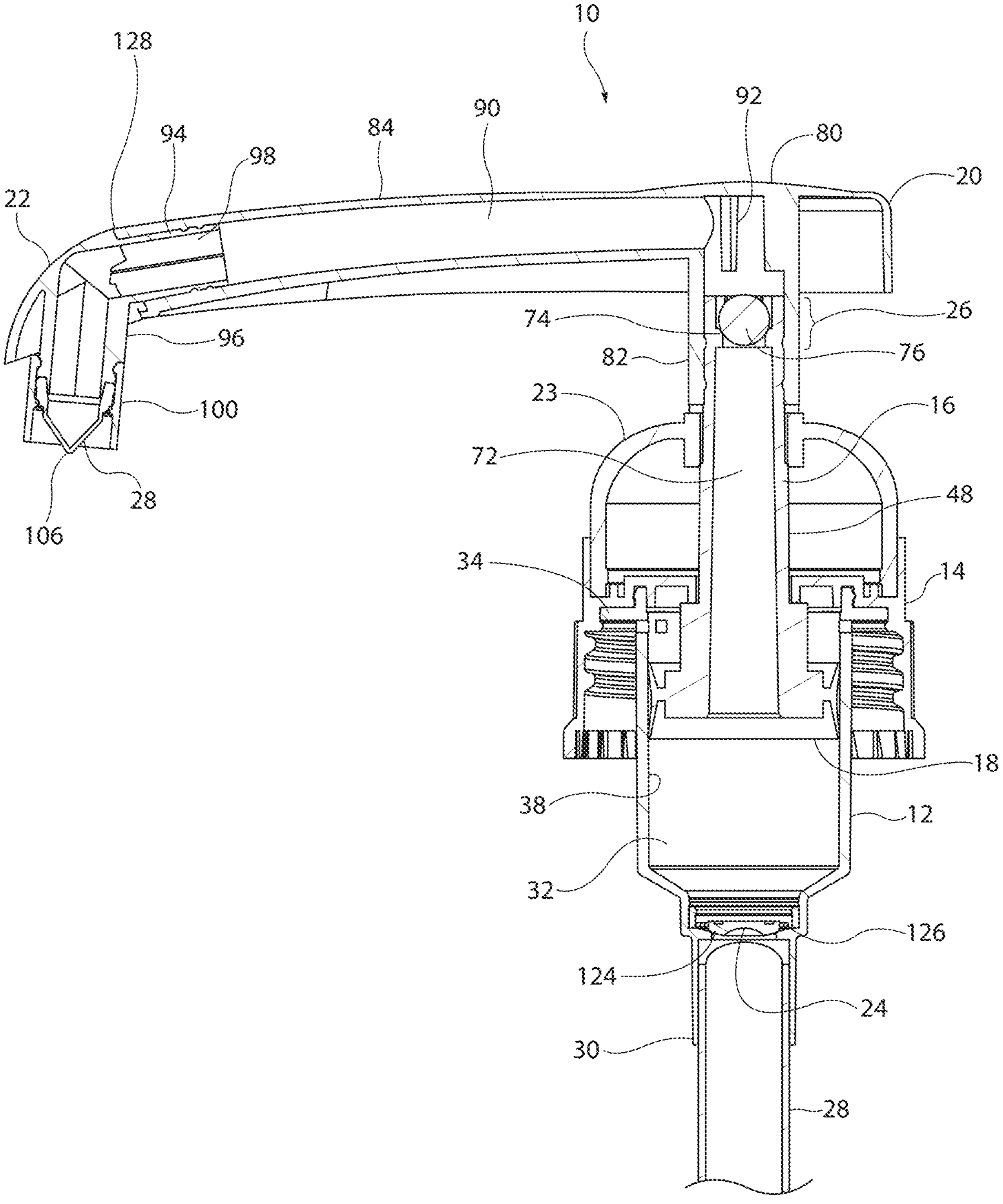
FIG. 2 is a cross-sectional of the hand operated, food pump of the present invention taken along the line 2-2 of FIG. 1.
Figure 3:
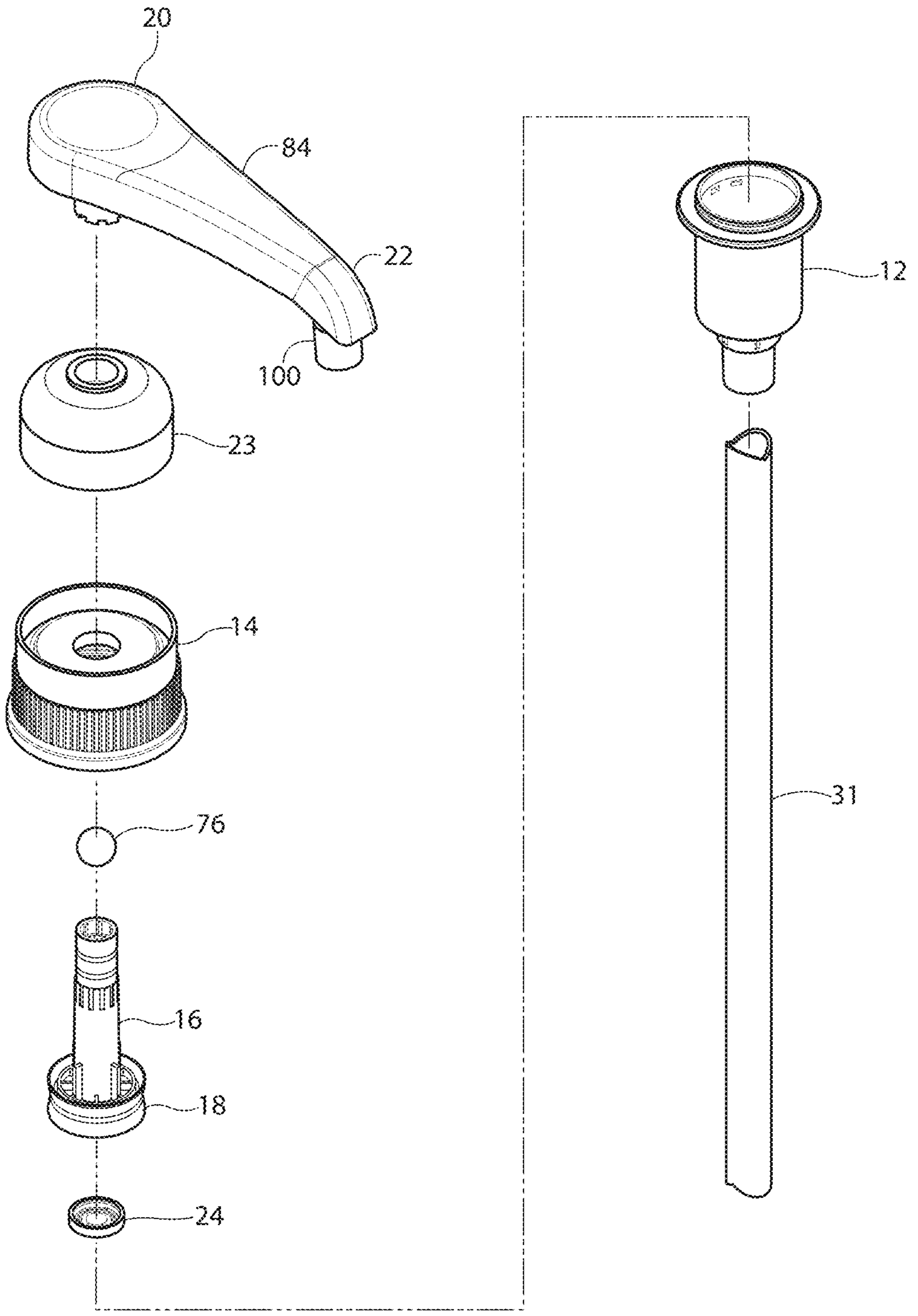
FIG. 3 is an exploded view of the hand operated, food pump of FIG. 1.
Figure 4:
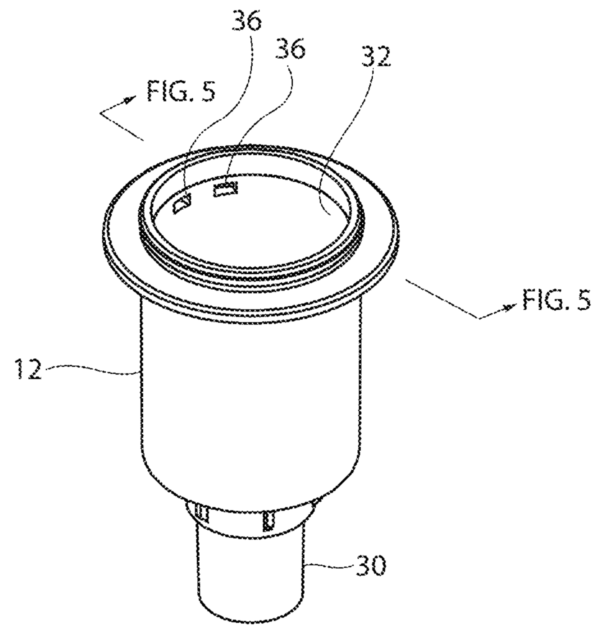
FIG. 4 is a perspective view of the housing of the hand operated, food pump of FIG. 1.
Figure 5:
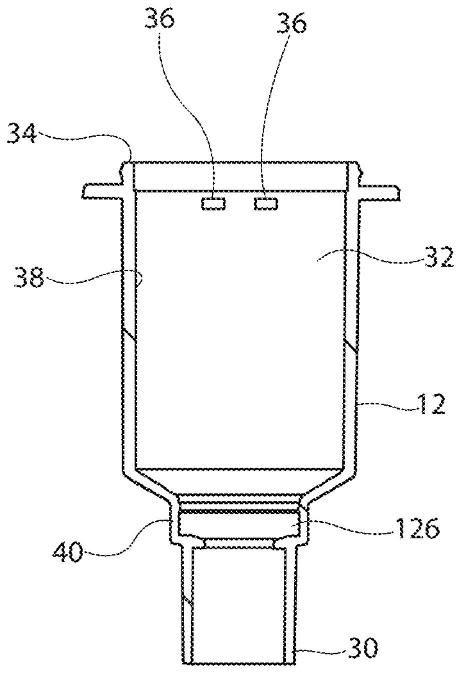
FIG. 5 is a cross-sectional view of the housing of the hand operated, food pump of FIG. 1.
Figure 6:
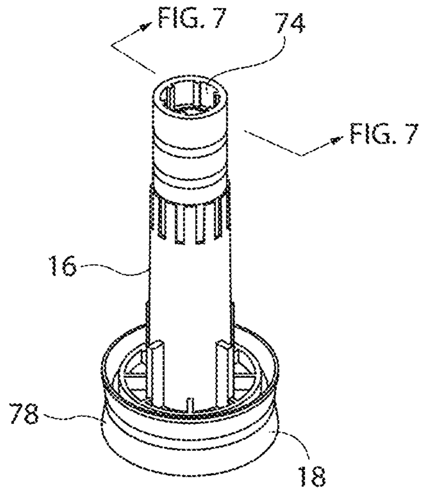
FIG. 6 is a perspective view of the stem and integrated piston of the hand operated, food pump of FIG. 1.
Figure 7:
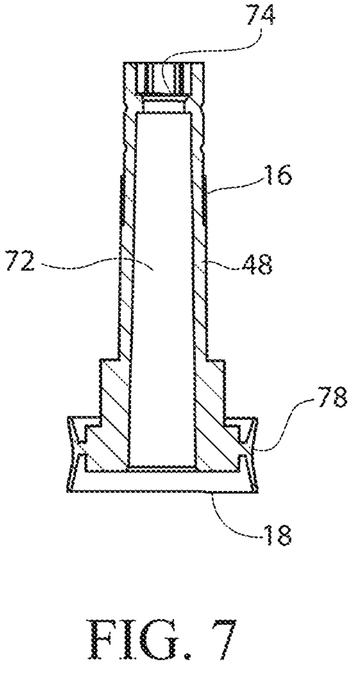
FIG. 7 is a cross-sectional view of the stem and integrated piston of the hand operated, food pump of FIG. 1.
Figure 8:
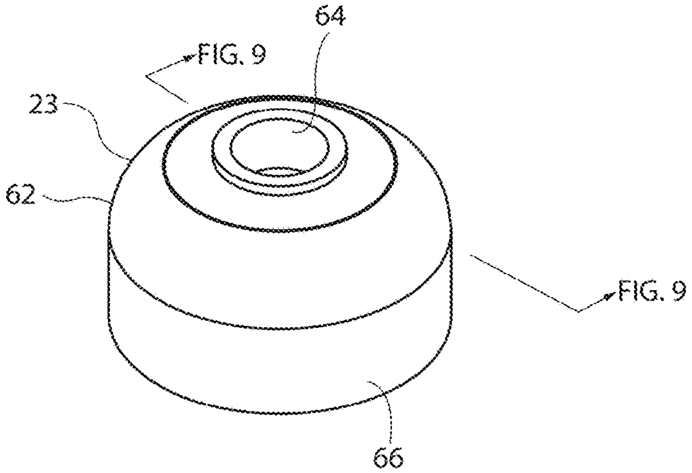
FIG. 8 is a perspective view of the return spring of the hand operated, food pump of FIG. 1.
Figure 9:
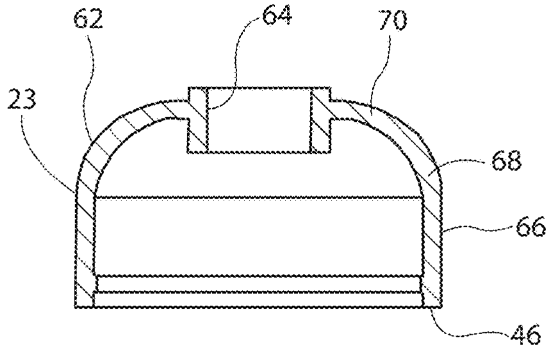
FIG. 9 is a cross-sectional view of the return spring of the hand operated, food pump of FIG. 1.
Figure 10:
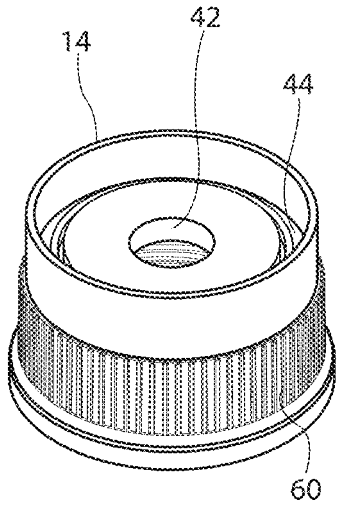
FIG. 10 is a perspective view of the closure of the hand operated, food pump of FIG. 1.
Figure 11:
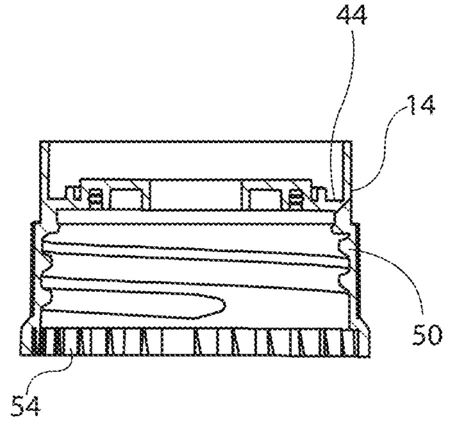
FIG. 11 is a cross-sectional view of the closure of the hand operated, food pump of FIG. 1.
Figure 12:
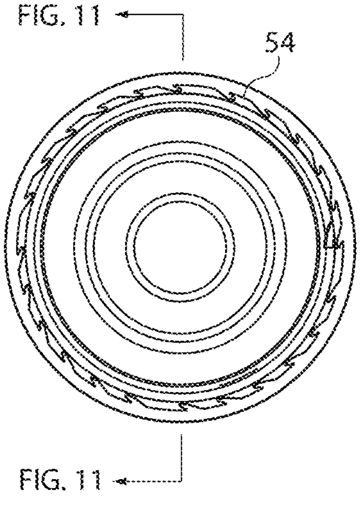
FIG. 12 is a bottom view of the closure of the hand operated, food pump of FIG. 1.
Figure 13:
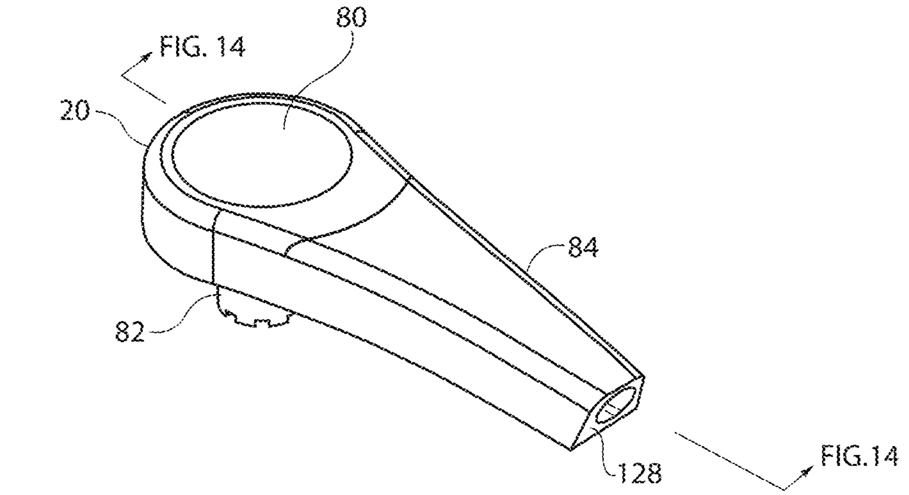
FIG. 13 is a perspective view of the actuator of the hand operated, food pump of FIG. 1.
Figure 14:
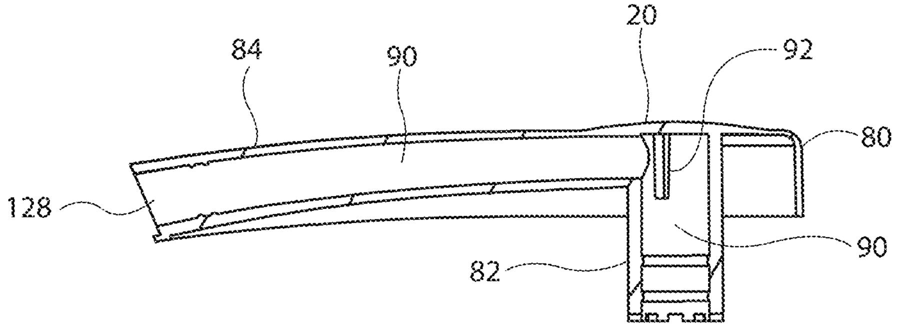
FIG. 14 is a cross-sectional view of the actuator of the hand operated, food pump of FIG. 1.
Figure 15:
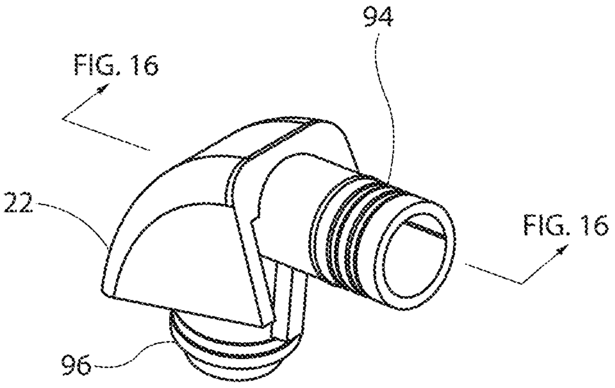
FIG. 15 is a perspective view of the nozzle of the hand operated, food pump of FIG. 1.
Figure 16:
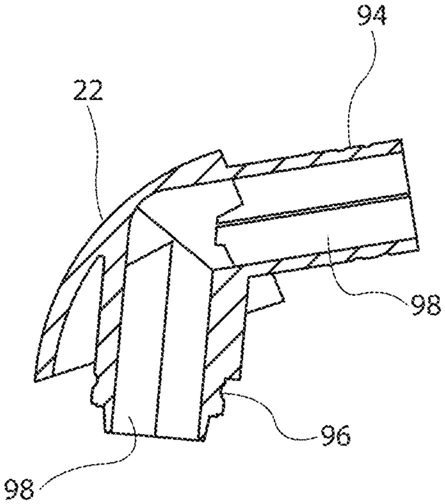
FIG. 16 is a cross-sectional view of the nozzle of the hand operated, food pump of FIG. 1.
Figure 17:
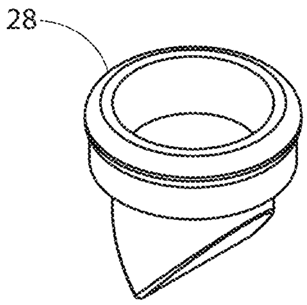
FIG. 17 is a perspective view of the nozzle valve of the hand operated, food pump of FIG. 1.
Figure 18:
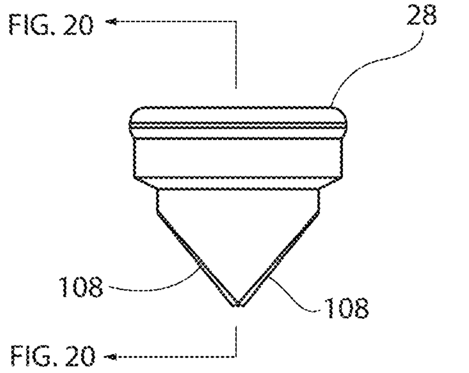
FIG. 18 is a side view of the nozzle valve of the hand operated, food pump of FIG. 1.
Figure 19:
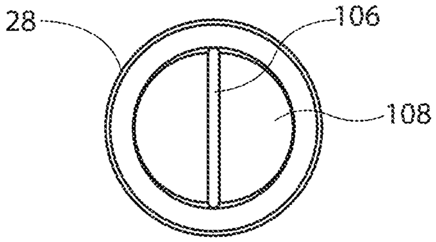
FIG. 19 is a bottom view of the nozzle valve of the hand operated, food pump of FIG. 1.
Figure 20:
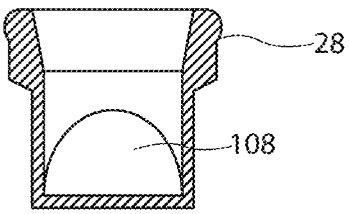
FIG. 20 is a cross-sectional view of the nozzle valve of the hand operated, food pump of FIG. 1.
Figure 21:
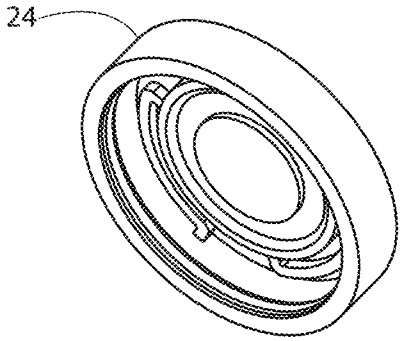
FIG. 21 is a perspective view of the lower valve of the hand operated, food pump of FIG. 1.
Figure 22:
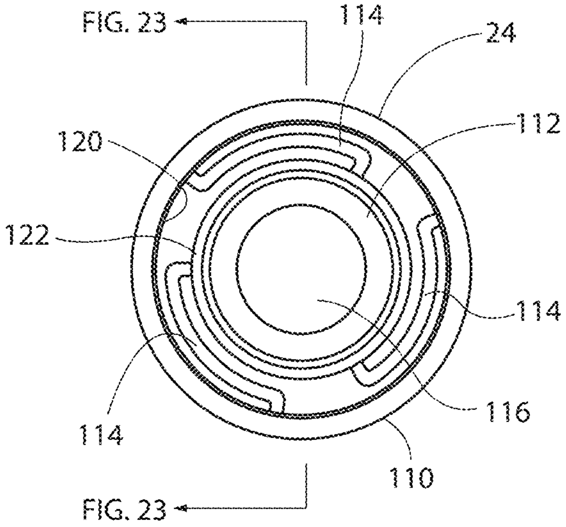
FIG. 22 is a top view of the lower valve of the hand operated, food pump of FIG. 1.
Figure 23:
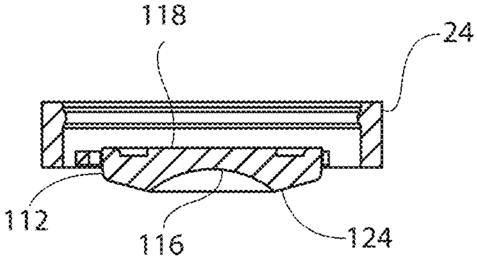
FIG. 23 is a cross-sectional view of the lower valve of the hand operated, food pump of FIG. 1.
Figure 24:
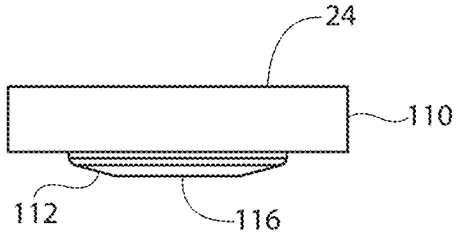
FIG. 24 is a side view of the nozzle valve of the hand operated, food pump of FIG. 1.
Figure 25:
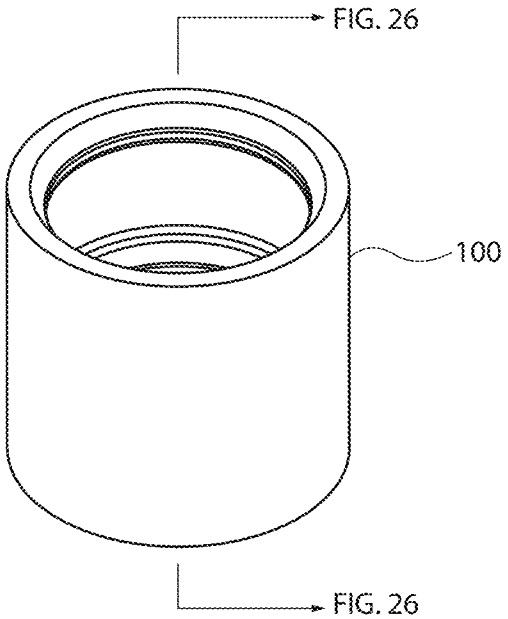
FIG. 25 is a perspective view of the nozzle valve holder of the hand operated, food pump of FIG. 1.
Figure 26:
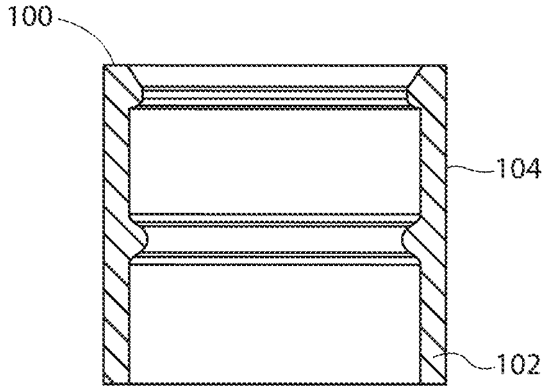
FIG. 26 is a cross-sectional view of the of the hand operated, food pump of FIG. 1.

With reference to FIGS. 1-3, the hand operated, food pump 10 of the present invention includes a housing 12, a closure 14, a stem 16 having an integral piston 18, an actuator 20, a nozzle 22, a plastic return spring 23, a lower valve 24, a primary upper valve 26 and a secondary upper valve or nozzle valve 28. The food pump 10 will typically be mounted on a container 29 and will have a dip tube 31 that reaches from a fluid inlet 30 of the housing 12 into the container 29.

With reference to FIGS. 1-3 and 4-5, the housing 12 is a generally hollow, cylindrical body having a bore 32. The housing 12 has an open upper end 34 and the fluid inlet 30 and includes at least one vent 36 disposed in a wall 38 of the housing near its open upper end 34. The at least one vent 36 vents the bore 32 to atmosphere during the operating cycle of the food pump 10. The at least one vent 36 is located in the bore 32 such that it is always above the highest level of the integral piston 18.

With reference to FIGS. 1-3 and 10-12, the closure 14 is configured with a hole 42 to receive a shaft portion 48 of the stem 16 and an upper radial groove 44 which receives an open, lower perimeter portion 46 of the plastic return spring 23. The closure 14 will typically also include internal threads 50 for attachment to mating external threads 52 on the container 29. The closure 14 may also include serrations 54 about a lower internal perimeter of the closure 14 which engage with tabs 56 on the container 29. This serration and tab arrangement prevents the closure 14 and consequently the food pump 10 from inadvertently loosening on the container 29, once installed. The closure 14 also includes vertical ribs 60 spaced about an exterior portion of the closure which serve as a gripping surface for a user.

With reference to FIGS. 1-3 and 8-9, the plastic return spring 23 has an upper portion 62 and which is dome-shaped and a cylindrical lower portion 66. The upper portion 62 includes a circular upper opening 64 through which passes the shaft portion 48 of the stem 16 when the food pump 10 is assembled. The cylindrical lower portion 66 includes the open, lower perimeter portion 46, which is disposed within the upper radial groove 44 of the closure 14, when the food pump 10 is assembled. The cylindrical lower portion 66 has a generally uniform wall thickness 68, whereas the upper portion 62 has a tapered wall thickness 70 that gradually tapers from the cylindrical lower portion 66 towards the circular upper opening 64. The tapered wall thickness 70 serves to ensure that bending of the plastic return spring 23 during a down-stroke of the actuator principally occurs in the upper portion 62.

With reference to FIGS. 1-3 and 6-7, the stem 16 comprises the shaft portion 48 and the integral piston 18. The stem 16 includes a first flow passage 72 which passes through both the shaft portion 48 and the integral piston 18. At an upper end of the flow passage 72 is a valve seat 74, which is configured to accept a valve ball 76. In the exemplary embodiment, the valve seat 74 and valve ball 76 comprise the upper valve 26. The upper valve 26 controls the flow of pumpable food product through the first flow passage 72 of the stem 16. Other configurations for the upper valve 26, such as, for example, diaphragm valves are also suitable.

The integral piston 18 of the stem 16 is configured to be in a slip-fit relationship with the bore 32 of the housing 12. The integral piston 18 is equipped with a cylindrical sealing surface 78 which slides and seals against the interior wall of the bore 32. The cylindrical sealing surface 78 is dished or convex about its outer perimeter, which provides for a seal against the wall of the bore 32, sufficient to substantially prevent pumpable food products from passing the sealing surface to bore interface.

With reference to FIGS. 1-3 and 13-14, the actuator 20 includes an upper head 80, a lower head 82, and a nozzle arm 86. The actuator 20 is configured with a second flow passage 90 which runs through the center of the upper and lower head portions 80 and 82 and continues through the center of the nozzle arm 84. The lower head 82 of the actuator 20 is configured to be a snap-fit with an upper end of the shaft portion 48 of the stem 16. The upper head 80 of the actuator 20 includes a blocking portion 92, which prevents the valve ball 76 from entering the second flow passage 90, when the upper valve 26 is open.

With reference to FIGS. 1-3, 15-16 and 25-26, the nozzle 22 is an elbow component having an inlet portion 94 and an outlet portion 128. The inlet portion 94 of the nozzle 22 is configured to be attachable to the outlet portion 128 of the nozzle arm 84 via a snap-fit. The outlet portion 96 of the nozzle 22 is configured to be attachable to a nozzle valve holder 100, also via a snap-fit. Running through the inlet portion 94 and the outlet portion 96 of the nozzle 22 is a third flow passage 98. The nozzle valve holder 100 has an inlet end 104 and an outlet end 102. The inlet end 104 of the nozzle valve holder 100 is configured to attach to the outlet portion 96 of the nozzle 22. The outlet portion 96 of the nozzle valve holder 100 is configured to retain the nozzle valve 28.

With reference to FIGS. 1-3 and 17-20, the nozzle valve 28 is a duckbill style valve having beveled sides 108, which terminate in a slit or narrow slot 106, which functions the outlet of the valve. A duckbill valve is a one-way check valve that allows fluid to flow in a single direction and prevents backflow and liquid dripping. The bill-like design is made of flexible material, like rubber or silicone, that opens when fluid pressure forces it open and closes to create a seal when pressure decreases.

With reference to FIGS. 1-3 and 21-24, the lower valve 24 is configured as a diaphragm style valve responsive to fluid or gas pressure. The lower valve 24 controls the entry of pumpable food product into the bore 32 of housing by opening and closing the inlet 30 to the housing. In the exemplary embodiment, the lower valve 24 comprises a ring 110 and a sealing element 112, where the sealing element 112 is suspended within the ring 110 by means of a plurality of elastic suspension elements 114, which are spaced about an interior perimeter 120 of the ring 110 and an exterior perimeter 122 of the sealing element 112. The sealing element 112 is configured with a dished or convex surface 116 which is circumscribed by a beveled, first sealing surface 124. The lower valve 24 is made from an elastic material which allows the sealing element 112, supported by the elastic suspension elements 114, to move upwardly or downwardly in response to changes in fluid pressure.

Formed integrally, above the inlet 30 of the housing 12 is a valve seat 40 which captively holds the lower valve 24 so that the beveled, first sealing surface 124 is retained just above a second sealing surface 126 formed in the housing 12. (See FIG. 1.) In response to positive fluid pressure created by a downstroke of the actuator 20 and stem 16 and integral piston 18, connected thereto, the first sealing surface 124 contacts the second sealing surface 126 and thereby closes the lower valve 24, thereby blocking fluid flow in the bore 32 of the housing 12. In response to negative pressure or suction caused by an upstroke of the actuator 20 and stem 16 and integral piston 18 connected thereto, the first sealing surface 124 of the lower valve 24 lifts off the second sealing surface 126 and thereby allows fluid to flow into the bore 32 of the housing 12.

Assembly of the Hand Operated, Food Pump

The food pump 10 of the present invention is configured such that the entire pump may be assembled by hand as all interconnections are configured as snap-fits. In step 1 of the exemplary assembly process, the lower valve 24 is placed in the valve seat 40 of the housing 12. In step 2, the stem 16 and integral piston 18 are placed in the bore 32 of the housing 12. In step 3, the shaft portion 48 of the stem 16 is inserted through the hole 42 of the closure 14 and the closure is snapped into place over the housing 12. In step 4, the shaft portion 48 of the stem 16 is inserted through the circular upper opening 64 in the plastic return spring 23 and the lower perimeter portion 46 of the plastic return spring 23 is fitted into the upper radial groove 44 of the closure 14.

Thereafter, in step 5, the valve ball 76 is inserted into the valve seat 74 of the stem 16. In step 6, the lower head 82 of the actuator 20 is snapped over an upper end of the shaft portion 48 of the stem 16. In step 7, the nozzle valve 28 is seated in the outlet end 102 of the nozzle valve holder 100. In step 9, the inlet end of the nozzle valve holder 104 is snapped over the outlet portion 96 of the nozzle 22. In step 10, the inlet portion 94 of the nozzle 22 is snapped into the outlet portion 128 of the nozzle arm 84, thereby completing assembly of the food pump 10.

Operation of the all Plastic Hand Pump

The hand operated, food pump 10 of the present invention operates as follows:

(1) On the first down stroke, air pressure caused by the integral piston 18 moving downwardly in the bore 32 of the housing 12 causes the lower valve 24 to close and simultaneously causes the primary upper valve 26 and the secondary upper valve or nozzle valve 28 to open. With the lower valve 24 closed and the primary upper valve 26 and secondary upper valve 28 open, air in the housing 12 is forced through the first flow passage 72 of the stem 16 and is exhausted through the secondary upper valve 28 via the second flow passage 90 and third flow passage 98, as the actuator 20 is depressed.

The secondary upper valve 28 assists the primary upper valve 26 in controlling the flow of the pumpable product by preventing backflow of the pumpable product into the flow passages 98 and 90 of the nozzle 22 and actuator 20, respectively. The secondary upper valve 28 also prevents the pumpable product from leaking when the food pump 10 is idle.

(2) On the first up stroke, suction caused by the integral piston 18 moving upwardly in the bore 32 of the housing 12 causes the lower valve 24 to open and the primary upper valve 26 and the secondary upper valve 28 to close. With the lower valve 24 open and the primary upper valve 26 and secondary upper valve 28 closed, pumpable food product is drawn from the container 29 through the dip tube 31 and into the bore 32 of the housing 12.

(3) On the second down stroke, as the integral piston 18 moves downwardly positive pressure again causes the lower valve 24 to close and the primary upper valve 26 and secondary upper valve 28 to open. With the lower valve 24 closed and the primary upper valve 26 and secondary upper valve 28 open, pumpable food product is forced into the first flow passage 72 of the stem 16 and is expelled out the secondary upper valve 28 via the second flow passage 90 and third flow passage 98, during downwards movement of the integral piston 18.

(4) On the second up stroke, suction caused by the integral piston 18 moving upwardly in the bore 32 of the housing 12 again causes the lower valve 24 to open and the primary upper valve 26 and secondary upper valve 28 to close. With the lower valve 24 open and the primary upper valve 26 and the secondary upper valve 28 are closed, pumpable food product is again drawn from the container 29 through the dip tube 31 and into the bore 32 of the housing 12.

The functions of steps (3) and (4) repeat each time the actuator 20 is subsequently depressed. During all operations, the plastic spring 23 acts as a compression spring and provides the force necessary to drive the integral piston upwardly on the upstroke of the actuator 20 and the stem 16 and integral piston 18, connected thereto.

Suitable materials for the food pump 10 of the present invention include polypropylene and polyethylene. Both polypropylene and polyethylene can be recycled and both materials are from the polyolefin family. Because both materials are from the polyolefin family, they are compatible when reground together and recycled. Therefore, if the food pump 10 of the present invention is made from one or both of these materials, there is no need to disassemble used pumps during recycling.

The primary upper valve 26 and the secondary upper valve 28 are normally closed when the food pump 10 is in the at rest position, and thereby seal against leakage of the pumpable product from the nozzle 22. With some pumpable products, the primary upper valve 26 may be open or partially open when the food pump 10 is in the at rest position as the ball 76 of the primary upper valve 26 may float in the pumpable product. In this situation however, the secondary upper valve 28 will remain closed in the at-rest position and will prevent the pumpable product from seeping back into the container 29 and causing a loss of prime.

Loss of prime occurs when the pumpable product slowly seeps back from the food pump 10 to the container 29, due to gravity. This can happen over a period of time when the food pump 10 is idle. Loss of prime will require the food pump 10 to be re-primed, i.e. (actuated) again, before dispensing the pumpable product.

The secondary upper valve 28 will also prevent pumpable product from leaking or dripping from the nozzle 22.

While the present invention has been described with regards to particular embodiments, it is recognized that additional variations of the present invention may be devised without departing from the inventive concept.

What is claimed is:

1. A hand operated pump for dispensing a pumpable product from a container, comprising:

a housing having a bore, a stem having a flow passage, an actuator having a flow passage, a piston, an elastic return spring, a primary upper valve, a secondary upper valve and a lower valve;

wherein, the primary upper valve is a ball valve, the secondary upper valve is a duckbill valve and the lower valve is a diaphragm valve;

wherein, the piston is connected to the stem and is configured to reciprocate within the bore of the housing;

wherein, the primary upper valve is disposed in the stem and controls flow of the pumpable product through the stem;

wherein, the lower valve is disposed in the bore of the housing and controls the flow of the pumpable product into the bore;

wherein, the secondary upper valve is disposed in the actuator and assists the primary upper valve in controlling the flow of the pumpable product;

wherein, the bore of the housing is in fluid communication with the flow passage of the stem, which is in fluid communication with the flow passage of actuator;

wherein, upon a down-stroke of the actuator and the piston connected thereto, the lower valve closes and the primary upper valve and secondary upper valve open causing the pumpable product in the bore to be expelled through the actuator;

wherein, upon an up-stroke of the actuator and the piston connected thereto, the lower valve opens and the primary upper valve and the secondary upper valve close, drawing the pumpable product into the bore; and a closure for attaching the hand operated pump to a container containing the pumpable product to be dispensed.

2. The hand operated, pump for dispensing a pumpable product of claim 1, wherein the closure includes serrations about a perimeter, the serrations engaging with one or more tabs disposed on a container, wherein the serrations and tabs prevent the closure from becoming loose on the container.

3. The hand operated pump for dispensing a pumpable product of claim 1, wherein the actuator includes a nozzle in which is disposed the secondary upper valve, wherein the nozzle is removably attachable to the actuator.

4. The hand operated pump for dispensing a pumpable product of claim 1, wherein the diaphragm valve includes a sealing element with a dished surface.

5. The hand operated pump for dispensing a pumpable product of claim 1, wherein the housing includes at least one vent disposed above the highest level of the piston in the bore of the housing.

6. The hand operated pump for dispensing a pumpable product of claim 1, wherein the piston is formed integrally with the stem.

7. The hand operated pump for dispensing a pumpable product of claim 1, wherein the pump is formed entirely of plastic materials.

8. A pump, comprising:

a housing having a bore, a stem having a flow passage, an actuator having a flow passage, a piston, a return spring, a primary upper valve, a secondary upper valve and a lower valve;

wherein, the piston is connected to the stem and is configured to reciprocate withing the bore of the housing;

wherein, the primary upper valve is disposed in the stem; wherein, the lower valve is disposed in the housing;

wherein, the secondary upper valve is disposed in the actuator;

wherein, the bore of the housing is in fluid communication with the flow passage of the stem, which is in fluid communication with the flow passage of actuator;

wherein, upon a down-stroke of the actuator and the piston connected thereto, the lower valve closes and the primary upper valve and secondary upper valve open, causing the pumpable product in the bore to be expelled through the secondary upper valve; and wherein, upon an up-stroke of the actuator and the piston connected thereto, the lower valve opens and the primary upper valve and the secondary upper valve close, drawing pumpable product into the bore.

9. The pump for dispensing a pumpable product of claim 8, wherein the secondary upper valve is a check valve that prevents backflowing of the pumpable product.

10. The pump for dispensing a pumpable product of claim 9, wherein the secondary upper valve is a duckbill valve.

11. The pump for dispensing a pumpable product of claim 8, wherein the lower valve is a diaphragm valve.

12. The pump for dispensing a pumpable product of claim 11, wherein the diaphragm valve includes a sealing element with a dished surface.

13. The pump for dispensing a pumpable product of claim 8, further including a closure, wherein the closure attaches the pump to a container containing the pumpable product to be dispensed.

14. The pump for dispensing a pumpable product of claim 13, wherein the closure includes serrations about a perimeter, the serrations engaging with a one or more tabs disposed on the container, wherein the serrations and tabs prevent the closure from becoming loose on the container.

15. The pump for dispensing a pumpable product of claim 8, wherein the actuator includes a nozzle in which is disposed the secondary upper valve, wherein the nozzle is removably attachable to the actuator.

16. The pump for dispensing a pumpable product of claim 8, wherein the return spring is cylindrical with a dome-shaped top and made of an elastic material.

17. The pump for dispensing a pumpable product of claim 16, wherein a wall thickness of the dome-shaped top tapers from a bottom of the dome-shaped top to a top of the dome-shaped top.

18. The pump for dispensing a pumpable product of claim 8, wherein the housing includes at least one vent disposed above the highest level of the piston in the bore.

19. The pump for dispensing a pumpable product of claim 8, wherein the piston is formed integrally with the stem.

20. The pump for dispensing a pumpable product of claim 8, wherein the pump is formed entirely of plastic materials.

21. The pump for dispensing a pumpable product of claim 8, wherein the actuator has a length greater than a radius of a container of a pumpable product to prevent the pumpable product from dripping on the container during dispensing.

22. The pump for dispensing a pumpable product of claim 8, wherein the actuator has a length greater than a diameter of the pump closure, measured from the vertical, axial center of the pump.

* * * * *